F. H. KITCHIN.
COOLING MEANS FOR INTERNAL COMBUSTION ENGINES.
APPLICATION FILED MAR. 18, 1914.
1,191,191. Patented July 18, 1916.
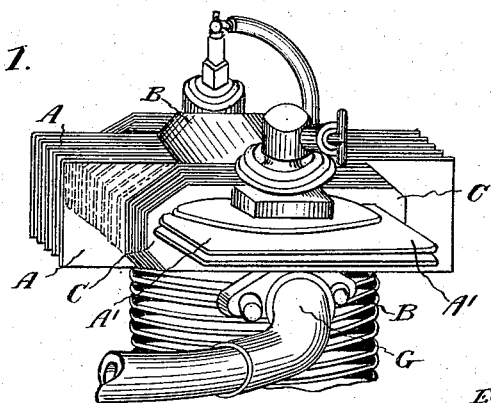
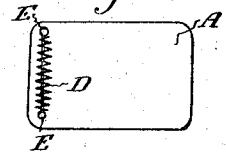
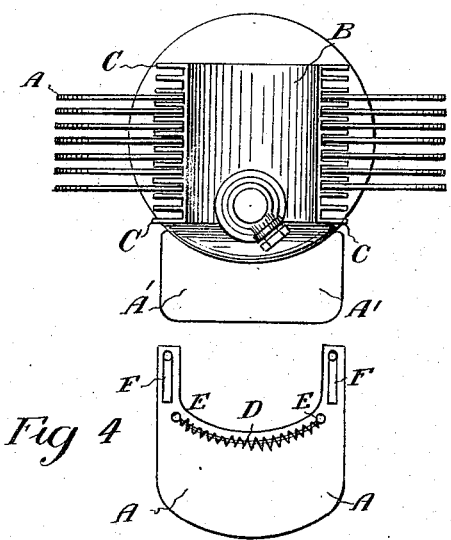
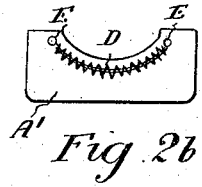
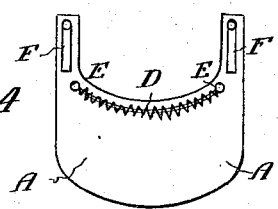
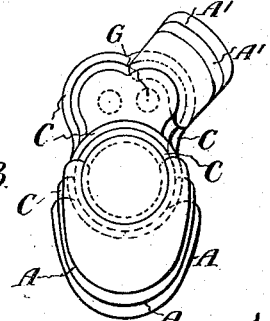
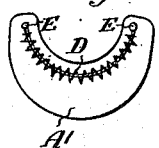
WITNESSES:
M. E. Rathvon
E. C. Swett
INVENTOR:
Frederick Harcourt Kitchin
By Calvin Calvert Attys

UNITED STATES PATENT OFFICE.

FREDERICK HARCOURT KITCHIN, OF GLASGOW, SCOTLAND.

COOLING MEANS FOR INTERNAL-COMBUSTION ENGINES.

1,191,191. Specification of Letters Patent. Patented July 18, 1916.

Application filed March 18, 1914. Serial No. 825,659.

*To all whom it may concern:*

Be it known that I, FREDERICK HARCOURT KITCHIN, B. A., J. P., of 11 Bowmont Gardens, Glasgow, Scotland, newspaper editor, have invented certain new and useful Cooling Means for Internal-Combustion Engines, of which the following is a specification.

This invention which relates to means of rendering cool, carrying off, and radiating the surplus heat generated in internal combustion engines has special reference to air cooled motors and motor cycle engines.

The invention consists in the employment of thin aluminium or other metal plates of more rapid emissivity, or power of heat dispersion under air draft, than cast iron to radiate and carry off the great heat in proximity to the exhaust port, combustion chamber, and upper part of the cylinder. The plates are detachable and when in position are held securely to the engine body at suitable points, as between the ribs or iron flanges of said engine body, by resilient means, such as helical springs coiled upon a central wire and fixed at either end to the plates.

In order that my invention may be properly understood and readily carried into effect, I have hereunto appended one sheet of drawings, of which—

Figure 1 is a perspective view of the upper part of an air cooled motor embodying my invention. Fig. 2 is a plan of the same. Figs. 2ª and 2ᵇ are plan views of the aluminium or analogous metal plates illustrating one form of the springs used to retain the plates in position between the iron flanges round the exhaust port and cylinder and combustion chamber of an air cooled motor. Fig. 3 is a corresponding view of a motor cycle engine embodying my improvements. Fig. 4 is a plan view of the aluminium or analogous metal plate illustrating one form of springs used to retain the plates in position between the iron flanges of a motor cycle cylinder and combustion chamber. Fig. 5 is a similar view of the aluminium plate illustrating the spring designed to retain the plates between the iron flanges around the exhaust port of a motor cycle engine, all hereafter more fully referred to and described.

In accordance with one of the simplest forms of the invention, A indicates the aluminium plates disposed around the upper part of the combustion chamber and cylinder B, and held between the usual heat radiating flanges or iron ribs C exterior of the cylinder. These plates may be rectangular, semicircular, or curved, in order to adapt themselves to the particular position required. The plates A are essentially detachable and are held in position upon the engine body by means of longitudinally straight or curved helical springs D coiled around a central wire or rod E which is riveted or otherwise attached to the plate A at the two extremities of the wire. In addition to the helical springs D, plate or ribbon springs F one at either side may be employed. This arrangement is illustrated in Fig. 4. By these means the plates are held securely in position between the flanges C of the motor cylinder.

In Figs. 1 and 3, A indicates the plates mounted on the upper part of the combustion chamber and cylinder, and $A^1$ those disposed around the exhaust port G.

The number of plates attached to a motor can be instantly varied so as to provide for the most efficient working temperature of the motor under varying conditions of weather and roads. They are put on or taken off without tools and are held tightly in place by the method of attachment so that they are undisturbed by vibration. Due to the aforesaid arrangement perfect cooling is secured and with this greater efficiency, better and cheaper lubrication, less wear and tear of working parts, and less carbon deposit. In short according to my invention, an air cooled motor is made as efficient as one which is water cooled. The shape and size of the metal plates are determined by the make and power of the motor for which they are designed.

Claims:

1. The combination with an internal combustion engine body provided with external ribs or flanges, of one or more separate radiator plates applied to said body between said ribs or flanges, and means engaging said ribs or flanges for retaining each of said plates in position on said body, said means including a helical spring secured at its ends to the corresponding plate.

2. The combination with an internal combustion engine body provided with external ribs or flanges, of one or more separate radiator plates applied to said body between said ribs or flanges, and means engaging said ribs or flanges for retaining each of said plates in position on said body, said means including one or more plate or ribbon springs secured at one end to the corresponding plate.

3. The combination with an internal combustion engine body provided with external ribs or flanges, of one or more separate radiator plates applied to said body between said ribs or flanges, and means engaging said ribs or flanges for retaining each of said plates in position on said body, said means comprising one or more plate or ribbon springs secured at one end to the corresponding plate, and a helical spring secured at both ends to said plate.

In witness whereof I affix my signature in presence of two witnesses.

FREDERICK HARCOURT KITCHIN.

Witnesses:
JOHN LIDDLE,
JOHN TRAVIS LIDDLE.

Copies of this patent may be obtained for five cents each, by addressing the "Commissioner of Patents, Washington, D. C."